(12) United States Patent
Nakashima et al.

(10) Patent No.: US 11,447,264 B2
(45) Date of Patent: Sep. 20, 2022

(54) POWER GENERATION CONTROLLER OF AIRCRAFT

(71) Applicant: KAWASAKI JUKOGYO KABUSHIKI KAISHA, Kobe (JP)

(72) Inventors: Kenichi Nakashima, Kobe (JP); Satoshi Ootsuki, Akashi (JP); Shuma Kobayashi, Kobe (JP); Kippei Matsuda, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/286,883

(22) PCT Filed: Oct. 21, 2019

(86) PCT No.: PCT/JP2019/041285
§ 371 (c)(1),
(2) Date: Apr. 20, 2021

(87) PCT Pub. No.: WO2020/085292
PCT Pub. Date: Apr. 30, 2020

(65) Prior Publication Data
US 2021/0380270 A1 Dec. 9, 2021

(30) Foreign Application Priority Data

Oct. 24, 2018 (JP) .............................. JP2018-199667

(51) Int. Cl.
*B64D 41/00* (2006.01)
*B64D 31/06* (2006.01)
(Continued)

(52) U.S. Cl.
CPC .............. *B64D 41/00* (2013.01); *B64C 19/00* (2013.01); *B64D 31/06* (2013.01); *B64D 31/14* (2013.01);
(Continued)

(58) Field of Classification Search
CPC ........ B64D 41/00; B64D 31/06; B64D 31/14; B64C 19/00; F04C 14/22; F16H 59/72;
(Continued)

(56) References Cited

U.S. PATENT DOCUMENTS 5,984,829 A * 11/1999 Minagawa ............ F16H 61/664
477/50
6,192,306 B1 * 2/2001 Kidokoro ............ F16H 61/6648
701/61
(Continued)

FOREIGN PATENT DOCUMENTS

EP 3428482 A1 * 1/2019 ............ B60W 10/06
JP 4495117 B2 6/2010
(Continued)

*Primary Examiner* — Charles Reid, Jr.
(74) *Attorney, Agent, or Firm* — Sughrue Mion, PLLC (57) ABSTRACT

A power generation controller of an aircraft includes a low-temperature start-up control section and a power generation control section. When it is determined that an oil temperature of a hydraulic actuator configured to change an operation position of a speed change element of a hydraulic transmission satisfies a predetermined low-temperature condition when starting up an aircraft engine, the low-temperature start-up control section sets a power generator to a power non-generating state and controls the hydraulic actuator such that the speed change element is positioned at an acceleration side of a median in a speed change range. When it is determined that the oil temperature satisfies a predetermined low-temperature start-up completion condition, the power generation control section sets the power generator to a power generating state and controls the hydraulic actuator in accordance with a rotational frequency of the aircraft engine.

8 Claims, 7 Drawing Sheets

(51) Int. Cl.
*B64D 31/14* (2006.01)
*F16H 15/38* (2006.01)
*F16H 59/72* (2006.01)
*F16H 61/664* (2006.01)
*H02P 9/06* (2006.01)
*B64C 19/00* (2006.01)
*F04C 14/22* (2006.01)
*H02P 101/25* (2016.01)
*H02P 101/30* (2015.01)
*B60W 50/00* (2006.01)

(52) U.S. Cl.
CPC ............. *F04C 14/22* (2013.01); *F16H 15/38* (2013.01); *F16H 59/72* (2013.01); *F16H 61/664* (2013.01); *H02P 9/06* (2013.01); *B60G 2800/90* (2013.01); *B60W 2050/0002* (2013.01); *H02P 2101/25* (2015.01); *H02P 2101/30* (2015.01)

(58) Field of Classification Search
CPC ....... B60G 2800/90; B60W 2050/0002; H02P 2101/30
USPC .......................................................... 290/51
See application file for complete search history.

(56) References Cited

U.S. PATENT DOCUMENTS

| | | | | |
|---|---|---|---|---|
| 6,620,076 | B1 * | 9/2003 | Kawamura | F16H 61/6649 477/107 |
| 2007/0069521 | A1 * | 3/2007 | Jabaji | F02D 29/06 290/40 C |
| 2013/0310208 | A1 * | 11/2013 | Shinojima | F16H 15/40 475/216 |

FOREIGN PATENT DOCUMENTS

| | | | | |
|---|---|---|---|---|
| WO | WO-2017154033 | A1 * | 9/2017 | ............ B60W 10/06 |
| WO | WO-2017154037 | A1 * | 9/2017 | ............. F16H 59/44 |

* cited by examiner

POWER GENERATION CONTROLLER OF AIRCRAFT

CROSS REFERENCE TO RELATED APPLICATIONS

This application is a National Stage of International Application No. PCT/JP2019/041285 filed Oct. 21, 2019, claiming priority based on Japanese Patent Application No. 2018-199667 filed Oct. 24, 2018.

TECHNICAL FIELD

The present invention relates to a power generation controller configured to control a hydraulic transmission configured to change the speed of rotational power of an aircraft engine and transmit the rotational power to a power generator.

BACKGROUND ART

Conventionally known is a power generation system configured such that: rotational power extracted from an aircraft engine is changed in speed by a transmission so as to have an appropriate rotational frequency; and the rotational power is then transmitted to a power generator. In many cases, a toroidal CVT is used as such transmission. Speed change control of the CVT is performed by a hydraulic actuator. Therefore, there is a problem that immediately after the start-up of the engine under low-temperature environment, the fluidity of operating oil of the hydraulic actuator is inadequate. On this account, PTL 1 proposes a method in which: when an oil temperature is less than a reference temperature, the power generator is set to a power non-generating state, a CVT operates at a maximum deceleration position, i.e., in a safe state, and the oil temperature is increased by stirring loss and/or the like; and when the oil temperature becomes the reference temperature or more, the power generator is set to a power generating state, and normal control of controlling the hydraulic actuator in accordance with an engine rotational frequency is performed.

CITATION LIST

Patent Literature

PTL 1: Japanese Patent No. 4495117

SUMMARY OF INVENTION

Technical Problem

When a change in rotational frequency increases since, for example, the rotational power of the aircraft engine (gas turbine) is extracted from a low-pressure shaft instead of a high-pressure shaft, the CVT increases in size in order to increase a speed change width of the CVT. If the CVT increases in size, and this increases a heat capacity of the CVT, a waiting time until the oil temperature increases becomes long even when the CVT operates while being fixed at the maximum deceleration position at the time of start-up at low temperature. Moreover, when a deceleration width of the CVT increases, and this increases a maximum reduction ratio, the rotational frequency after deceleration becomes low, and a temperature increasing effect by the stirring loss decreases.

An object of the present invention is to provide a power generation controller configured to control a hydraulic transmission configured to change the speed of rotational power of an aircraft engine and transmit the rotational power to a power generator, the power generation controller being capable of shortening a warm-up time by quickly increasing an oil temperature at the time of start-up at low temperature.

Solution to Problem

A power generation controller of an aircraft according to one aspect of the present invention is a power generation controller configured to control a hydraulic transmission configured to change speed of rotational power of an aircraft engine and transmit the rotational power to a power generator, the power generation controller including: a low-temperature start-up control section configured to, when it is determined that an oil temperature of a hydraulic actuator configured to change an operation position of a speed change element of the hydraulic transmission satisfies a predetermined low-temperature condition when starting up the aircraft engine, set the power generator to a power non-generating state and control the hydraulic actuator such that the speed change element is positioned at an acceleration side of a median in a speed change range; and a power generation control section configured to, when it is determined that the oil temperature satisfies a predetermined low-temperature start-up completion condition, set the power generator to a power generating state and control the hydraulic actuator in accordance with a rotational frequency of the aircraft engine.

According to the above configuration, when starting up the aircraft engine under low-temperature environment, performed is low-temperature start-up control in which the speed change element of the hydraulic transmission is positioned at the acceleration side of the median in the speed change range. Therefore, the rotational frequency of the transmission increases, and heat generated by stirring loss and/or the like is increased. With this, a warm-up time until the start of the power generation can be shortened.

The hydraulic transmission may be a continuously variable transmission including an upper limit stopper configured to defines a maximum acceleration position of the speed change element. When the oil temperature satisfies the low-temperature condition, the low-temperature start-up control section continuously outputs an acceleration-side drive signal to the hydraulic actuator such that the speed change element is positioned at the maximum acceleration position defined by the upper limit stopper.

According to the above configuration, complex control does not have to be performed as the low-temperature start-up control for quick warm-up.

The low-temperature start-up completion condition may include a temperature continuation condition in which a state where the oil temperature is a reference temperature or more is continued for a predetermined period of time or more.

According to the above configuration, even when the temperature of operating oil used in the hydraulic actuator is non-uniform, whether or not the low-temperature start-up completion condition is satisfied can be determined based on the information of the oil temperature that is averaged to some extent. Therefore, it is possible to prevent, for example, a case where the switching to the power generation control is performed when the oil temperature is low and a case where the quick switching to the power generation control is not performed even though the oil temperature is high.

The power generation controller may further include a temperature condition determining section configured to determine whether or not the oil temperature satisfies the low-temperature start-up completion condition. The temperature condition determining section may sample information of the oil temperature at a predetermined cycle. The low-temperature start-up completion condition may be a condition in which a number of times a sample value of the oil temperature becomes a reference temperature or more becomes a predetermined number of times or more in a row.

According to the above configuration, the reliable oil temperature information which is not influenced by temperature variation can be easily acquired.

When an absolute value of a deviation between a previous value of the sample value and a current value of the sample value is a first threshold or more, the temperature condition determining section may substitute the previous value for the current value.

According to the above configuration, when the information of the oil temperature which is significantly different in value from the actual oil temperature is momentarily received due to pulse noise or the like, such inaccurate value is prevented from being used in the condition determination of the oil temperature.

When a number of times the absolute value of the deviation becomes a second threshold or more becomes a predetermined number of times or more in a row, the temperature condition determining section may reset the previous value.

According to the above configuration, when a first value of the sample value of the oil temperature is significantly different from the actual oil temperature due to noise or the like, the previous value can be reset and corrected to the accurate oil temperature.

When it is determined that the rotational frequency of the aircraft engine has exceeded a predetermined rotational frequency, the low-temperature start-up control section may output a protection signal which weakens the rotational power transmitted to the power generator through the hydraulic transmission.

According to the above configuration, for example, even when a pilot makes the engine idle, and this significantly increases the engine rotational frequency, accelerated high-rotation power can be prevented from being transmitted to the power generator.

The protection signal may be a signal which controls the hydraulic actuator such that the speed change element is positioned at a deceleration side of the median in the speed change range.

According to the above configuration, for example, even when the pilot makes the engine idle, and this significantly increases the engine rotational frequency, the power generator can be prevented from excessively rotating by the control of the transmission.

Advantageous Effects of Invention

According to the present invention, in the power generation controller configured to control the hydraulic transmission configured to change the speed of the rotational power of the aircraft engine and transmit the rotational power to the power generator, the warm-up time can be shortened by quickly increasing the oil temperature at the time of start-up at low temperature.

DESCRIPTION OF EMBODIMENTS

Hereinafter, an embodiment will be described with reference to the drawings.

Figure 1:
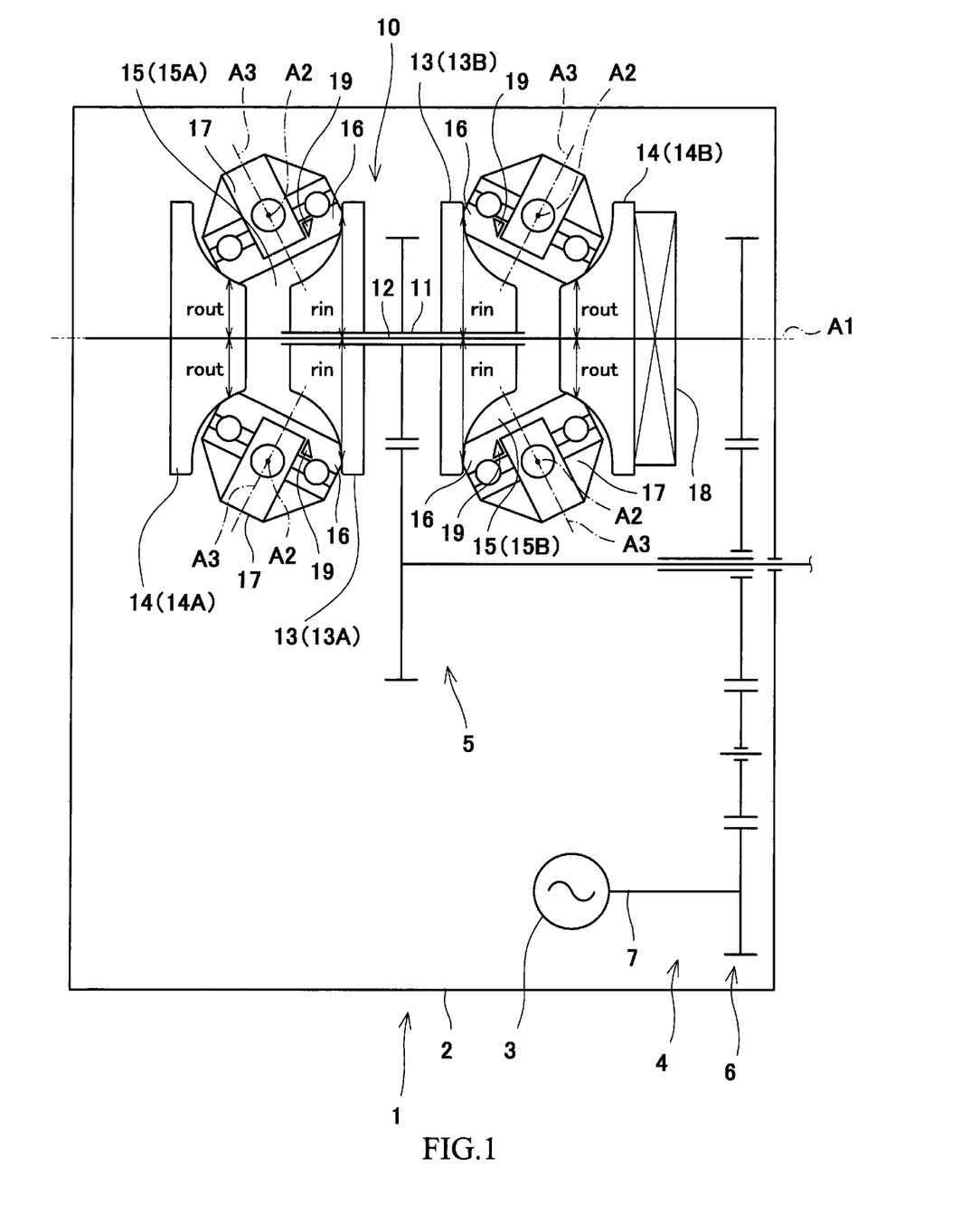
FIG. 1 is a schematic diagram showing a drive mechanism-integrated electric power generating apparatus according to an embodiment.

FIG. 1 is a schematic diagram showing a drive mechanism-integrated electric power generating apparatus 1 according to an embodiment. As shown in FIG. 1, the drive mechanism-integrated electric power generating apparatus 1 (Integrated Drive Generator; hereinafter referred to as an "IDG") is used as an AC power supply of an aircraft. When starting up the IDG 1, rotational power of a rotating shaft of an aircraft engine (not shown) starts being transmitted to the IDG 1. However, until the IDG 1 can stably operate, electric components in an aircraft are driven by an auxiliary power supply (for example, an external power generator or an auxiliary power generator) that is different from the IDG 1. When the IDG 1 can stably operate, a power supply for the electric components is switched from the auxiliary power supply to the IDG 1. Since the IDG 1 is used as a main power supply of the aircraft, power supply switching from the auxiliary power supply to the IDG 1 is performed before the aircraft takes off.

The IDG 1 includes a casing 2 attached to the aircraft engine. A power generator 3 is accommodated in the casing 2 together with a constant-speed driving device (Constant Speed Drive; hereinafter referred to as a "CSD") 4. The CSD 4 forms a power transmission path through which the rotational power of the rotating shaft of the aircraft engine is transmitted to the power generator 3, and a toroidal continuously variable transmission 10 (hereinafter referred to as a "CVT") constitutes part of the power transmission path. The rotational power of the rotating shaft of the engine is input to the CVT 10 through an input path 5 of the CSD 4, is changed in speed by the CVT 10, and is output to a power generator shaft 7 through an output path 6 of the CSD 4. The power generator 3 generates AC power having a frequency proportional to rotational speed of the power generator shaft 7. A speed change ratio of the CVT 10 is continuously changed such that the rotational speed of the power generator shaft 7 is maintained at an appropriate value (value corresponding to frequency by which the electric components in the aircraft stably operate) regardless of a change in the rotational speed of the rotating shaft of the engine. With this, the frequency of the AC power generated by the power generator 3 is maintained at an appropriate value, and therefore, the electric components in the aircraft stably operate.

In the CVT 10, a CVT input shaft 11 and a CVT output shaft 12 are coaxially arranged on a CVT axis A1. An input disc 13 is provided on the CVT input shaft 11 so as to be integrally rotatable, and an output disc 14 is provided on the CVT output shaft 12 so as to be integrally rotatable. The input disc 13 and the output disc 14 are opposed to each other to form an annular cavity 15. In the present embodiment, the CVT 10 is of a double-cavity type as one example and includes input discs 13A and 13B that are the same in structure as each other and output discs 14A and 14B that are the same in structure as each other, and two cavities 15A and 15B are lined up in a direction along the CVT axis A1. Two power rollers 16 (speed change elements) are arranged in one cavity 15, and each of the power rollers 16 is supported by a trunnion 17 so as to be rotatable about a rolling axis A3. The trunnions 17 correspond to the power rollers 16 one-to-one. Each of the trunnions 17 is supported by the casing 2 so as to be displaceable in an extending direction of a tilting axis A2 and rotatable about the tilting axis A2.

Each of the power rollers 16 is supplied with traction oil and is pressed against the discs 13 and 14 by clamping force generated by a clamp mechanism 18. The clamp mechanism 18 may be of a cam type (may also be called a loading cam mechanism) or a hydraulic type. The CVT input shaft 11 is rotated by the rotational power input from the input path 5. When the CVT input shaft 11 rotates, the input disc 13 rotates integrally, and the power roller 16 is rotated about the rolling axis A3 by shear resistance of an oil film generated at an input-side contact portion. When the power roller 16 rotates about the rolling axis A3, the output disc 14 is rotated by shear resistance of an oil film generated at an output-side contact portion, and therefore, the CVT output shaft 12 rotates integrally. The rotational power of the CVT output shaft 12 is output to the output path 6.

The speed change ratio is continuously changed in accordance with a position (roller position X) of the power roller 16 in the extending direction of the tilting axis A2. The speed change ratio is defined as a ratio of an output rotational speed (rotational speed of the CVT output shaft 12) N2 of the CVT 10 to an input rotational speed (rotational speed of the CVT input shaft 11) N1 of the CVT 10 and is equal to a radius ratio ($SR=N2/N1=r_{in}/r_{out}$). The radius ratio is a ratio of an input-side contact radius $r_{in}$ (distance from the CVT axis A1 to the input-side contact portion) to an output-side contact radius $r_{out}$ (distance from the CVT axis A1 to the output-side contact portion). When the roller position X is changed, the power roller 16 rotates about the tilting axis A2 until side slip is eliminated. Thus, a rotation angle (tilt angle $\varphi$) of the power roller 16 around the tilting axis A2 is changed. When the tilt angle $\varphi$ is changed, the input-side contact portion and the output-side contact portion are displaced, and therefore, the input-side contact radius $r_{in}$ and the output-side contact radius $r_{out}$ are continuously changed. Thus, the speed change ratio is continuously changed.

A tilting allowable range of the power roller 16 is mechanically determined by stoppers provided at the trunnion 17 in order to prevent excessive tilting. FIG. 1 shows an upper limit stopper 19 configured to define a maximum acceleration position of the power roller 16. In addition, a lower limit stopper (not shown) configured to define a maximum deceleration position of the power roller 16 is also provided.

Figure 2:
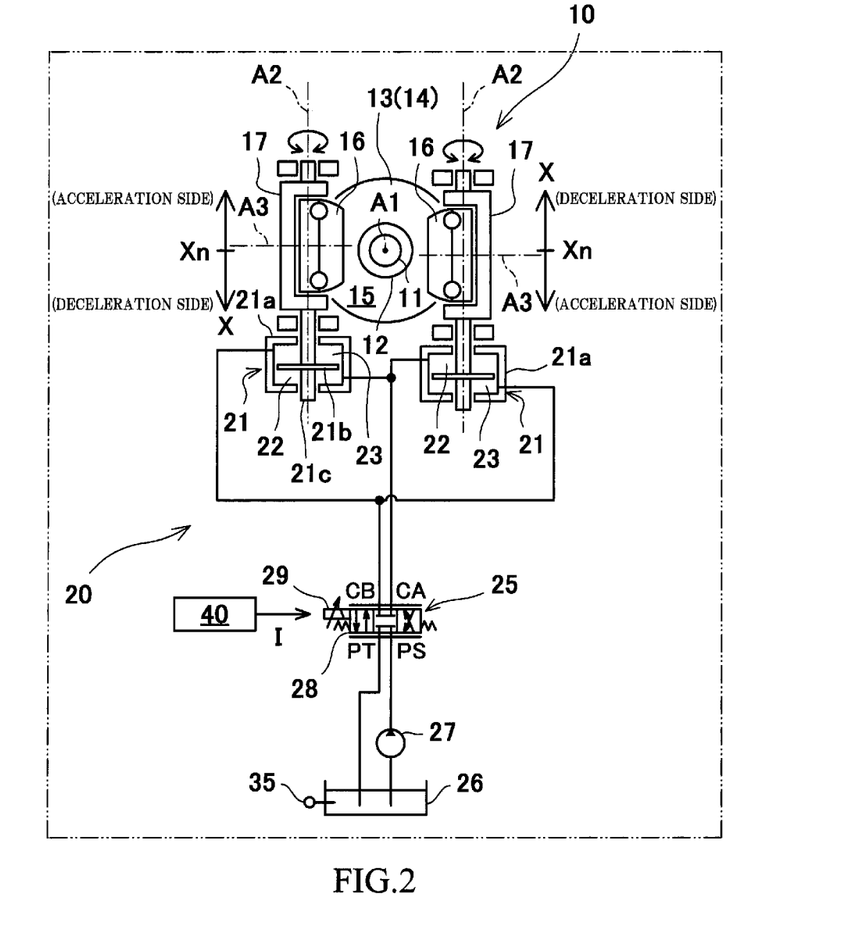
FIG. 2 is a hydraulic circuit diagram showing a toroidal continuously variable transmission of the apparatus shown in FIG. 1.

FIG. 2 is a hydraulic circuit diagram showing the CVT 10 of the apparatus 1 shown in FIG. 1. As shown in FIG. 2, the roller position X is changed by a hydraulic actuator 20. To be specific, the CVT 10 is a hydraulic transmission. The hydraulic actuator 20 includes a plurality of hydraulic cylinders 21. The hydraulic cylinders 21 correspond to the power rollers 16 one-to-one and also correspond to the trunnions 17 one-to-one. Each of the hydraulic cylinders 21 includes a body 21a, a piston 21b, and a rod 21c. An inside of the body 21a of the hydraulic cylinder 21 is divided into an acceleration chamber 22 and a deceleration chamber 23 by the piston 21b. The rod 21c is arranged coaxially with the tilting axis A2 and couples the piston 21b to the trunnion 17. The rod 21c moves together with the trunnion 17 and the power roller 16 in the extending direction of the tilting axis A2.

When the oil is supplied to the acceleration chamber 22 and discharged from the deceleration chamber 23, the roller position X is changed toward an acceleration side in the extending direction of the tilting axis A2. When the oil flows in its opposite direction, the roller position X is changed toward a deceleration side that is an opposite side of the acceleration side in the extending direction of the tilting axis A2. When changing the roller positions X of two power rollers 16 arranged in one cavity 15, the two power rollers 16 are displaced in respective directions opposite to each other along the extending direction of the tilting axis A2 such that the radius ratios of the two power rollers 16 arranged in the cavity 15 are maintained to be equal in value to each other.

When the roller position X is changed toward the acceleration side, the tilt angle $\varphi$ becomes large, and the speed change ratio increases. When the roller position X is changed toward the deceleration side, the tilt angle $\varphi$ becomes small, and the speed change ratio decreases. When the roller position X reaches an upper limit point, the tilt angle $\varphi$ becomes a maximum tilt angle, and the speed change ratio becomes a maximum speed change ratio that exceeds one. When the roller position X reaches a lower limit point, the tilt angle $\varphi$ becomes a minimum tilt angle, and the speed change ratio is a minimum speed change ratio that is less than one. When the roller position X is located at a neutral point, the tilt angle $\varphi$ becomes a neutral angle, and the speed change ratio becomes one. The neutral angle is substantially equal to a median in the tilting allowable range.

The hydraulic actuator 20 includes a control valve 25. The hydraulic cylinders 21 correspond to the power rollers 16 one-to-one, and one control valve 25 is provided so as to correspond to, for example, a plurality of power rollers 16. The control valve 25 is a four-direction switching valve and includes a supply port PS, a return port PT, an acceleration control port CA, and a deceleration control port CB. A hydraulic pump 27 configured to suck the oil from an oil tank 26 is connected to the supply port PS, and the return port PT is connected to the oil tank 26. The acceleration control port CA is connected to the acceleration chamber 22, and the deceleration chamber 23 is connected to the deceleration control port CB. The control valve 25 is a spool valve, and connection statuses of the ports of the control valve 25 change in accordance with the position of a spool 28. The control valve 25 is a three-position switching valve, and the spool 28 is positioned in a blocking region (a middle position in FIG. 2), an acceleration region (a left position in FIG. 2), or a deceleration region (a right position in FIG. 2).

In the blocking region, the control ports CA and CB are blocked from the supply port PS and the return port PT. At this time, the supply of the oil to the acceleration chamber 22 and the deceleration chamber 23 and the discharge of the oil from the acceleration chamber 22 and the deceleration chamber 23 stop, and the speed change ratio is maintained. In the acceleration region, the acceleration control port CA is connected to the supply port PS, and the deceleration control port CB is connected to the return port PT. At this time, the oil is supplied to the acceleration chamber 22 and discharged from the deceleration chamber 23, and the speed change ratio increases. In the deceleration region, the acceleration control port CA is connected to the return port PT, and the deceleration control port CB is connected to the supply port PS. At this time, the oil is supplied to the deceleration chamber 23 and discharged from the acceleration chamber 22, and the speed change ratio decreases. When the spool 28 is positioned in the acceleration region or the deceleration region, each of an opening degree of the supply port PS and an opening degree of the return port PT is variably set in accordance with a spool position in the region.

The control valve 25 includes a driving portion 29 configured to drive the spool 28 to control the spool position and the opening degrees. The flow rates and pressures of the oil supplied to and discharged from the acceleration chamber 22 and the deceleration chamber 23 are adjusted by the driving portion 29. The control valve 25 is an electric valve, and the driving portion 29 receives a drive signal from a power generation controller 40 and controls the spool position and the opening degrees in accordance with an output value (current value) of the drive signal.

The IDG 1 is provided with an oil temperature sensor 35 configured to detect the temperature of the operating oil of the hydraulic actuator 20. The oil temperature sensor 35 may be arranged anywhere as long as the oil temperature sensor 35 can detect the temperature of the oil flowing through a hydraulic circuit of the hydraulic actuator 20. As one example, the oil temperature sensor 35 is arranged at such a position as to detect the temperature of the oil stored in the oil tank 26. It should be noted that the oil temperature may be estimated from an outside ambient temperature. The oil in the oil tank 26 is used as the operating oil of the hydraulic actuator 20 and is also used to, for example, lubricate the power roller 16. Therefore, the oil scatters in the casing 2 and is collected in the oil tank 26.

Figure 3:
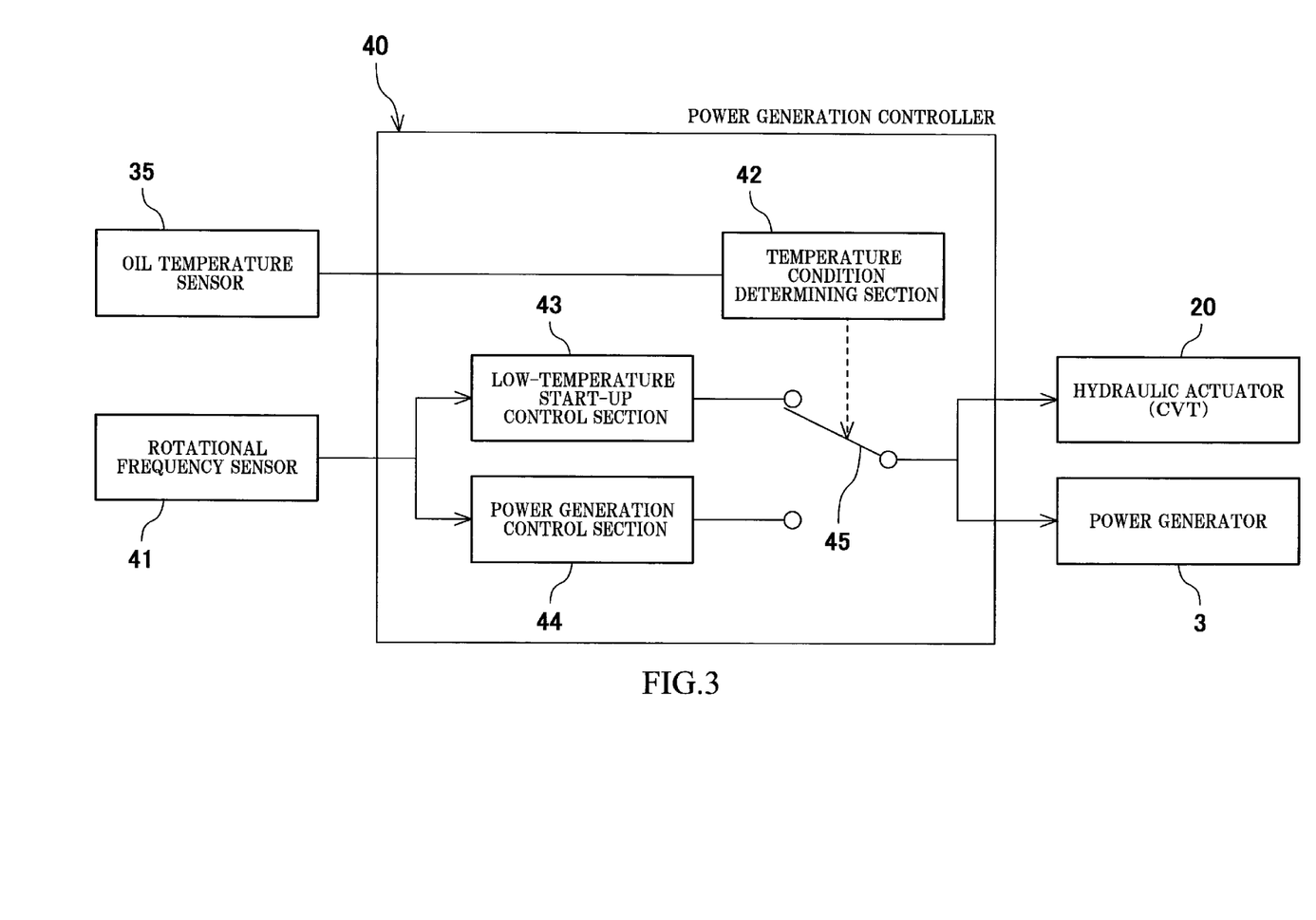
FIG. 3 is a block diagram of a power generation controller shown in FIG. 2.

FIG. 3 is a block diagram showing the power generation controller 40 shown in FIG. 2. As shown in FIG. 3, the oil temperature detected by the oil temperature sensor 35 and an engine rotational frequency detected by a rotational frequency sensor 41 are input to the power generation controller 40. It should be noted that the rotational frequency sensor 41 may detect another rotational frequency (for example, a rotational frequency of the input disc 13A of the CVT 10) which can be converted into the engine rotational frequency. A control signal of the power generation controller 40 is output to the hydraulic actuator 20 and the power generator 3.

The power generation controller 40 includes a processor, a volatile memory, a non-volatile memory, an I/O interface, and the like in terms of hardware. The power generation controller 40 includes a temperature condition determining section 42, a low-temperature start-up control section 43, a power generation control section 44, and a switching section 45 in terms of software. These sections 42 to 45 are realized in such a manner that the processor performs calculation processing by using the volatile memory based on a program stored in the non-volatile memory.

The temperature condition determining section 42 determines whether or not the oil temperature detected by the oil temperature sensor 35 when starting up the engine satisfies a below-described low-temperature condition. Moreover, the temperature condition determining section 42 also determines whether or not the oil temperature detected by the oil temperature sensor 35 satisfies a predetermined low-temperature start-up completion condition.

The low-temperature start-up control section 43 sets the power generator 3 to a power non-generating state and controls the hydraulic actuator 20 such that the power roller 16 is located at the acceleration side of a median of a speed change range. In the present embodiment, the low-temperature start-up control section 43 continuously outputs an acceleration-side drive signal to the hydraulic actuator 20 such that the trunnion 17 which tilts integrally with the power roller 16 is brought into contact with the upper limit stopper 19, and with this, the power roller 16 is positioned at the maximum acceleration position.

The power generation control section 44 sets the power generator 3 to a power generating state and controls the hydraulic actuator 20 in accordance with the engine rotational frequency detected by the rotational frequency sensor 41. Specifically, the power generation control section 44 controls the hydraulic actuator 20 to adjust the speed change ratio of the CVT 10 such that the rotational frequency of the power generator 3 becomes constant even when the engine rotational frequency changes.

The switching section 45 is configured to be able to be selectively switched between a low-temperature start-up control state in which the low-temperature start-up control section 43 controls the hydraulic actuator 20 and the power generator 3 and a power generation control state in which the power generation control section 44 controls the hydraulic actuator 20 and the power generator 3. When the temperature condition determining section 42 determines that the oil temperature satisfies the low-temperature condition, the switching section 45 is switched to the low-temperature start-up control state. When the temperature condition determining section 42 determines that the oil temperature satisfies the below-described low-temperature start-up completion condition, the switching section 45 is switched to the power generation control state.

Figure 4:
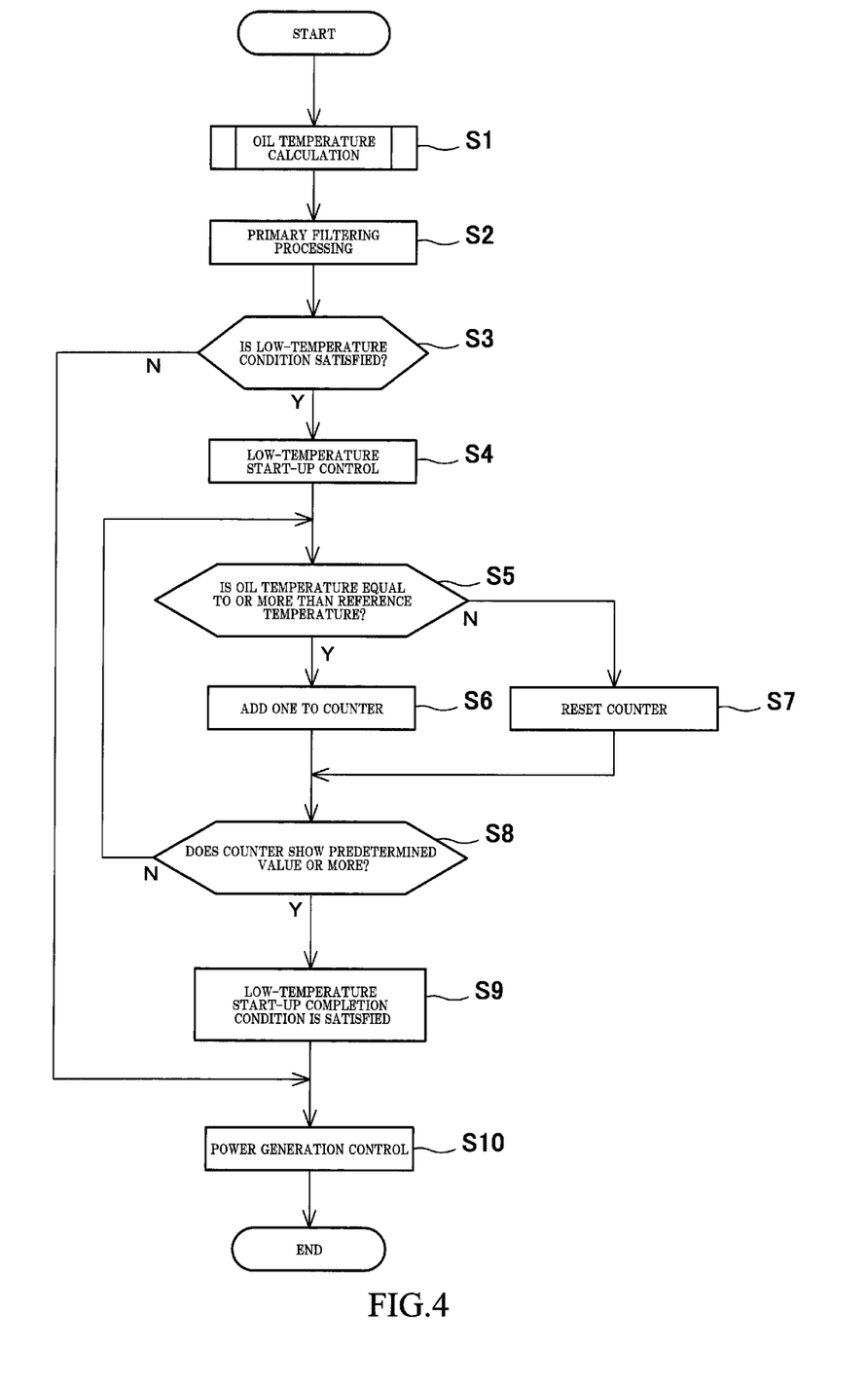
FIG. 4 is a flowchart for explaining control contents of the power generation controller shown in FIG. 3.
Figure 5:
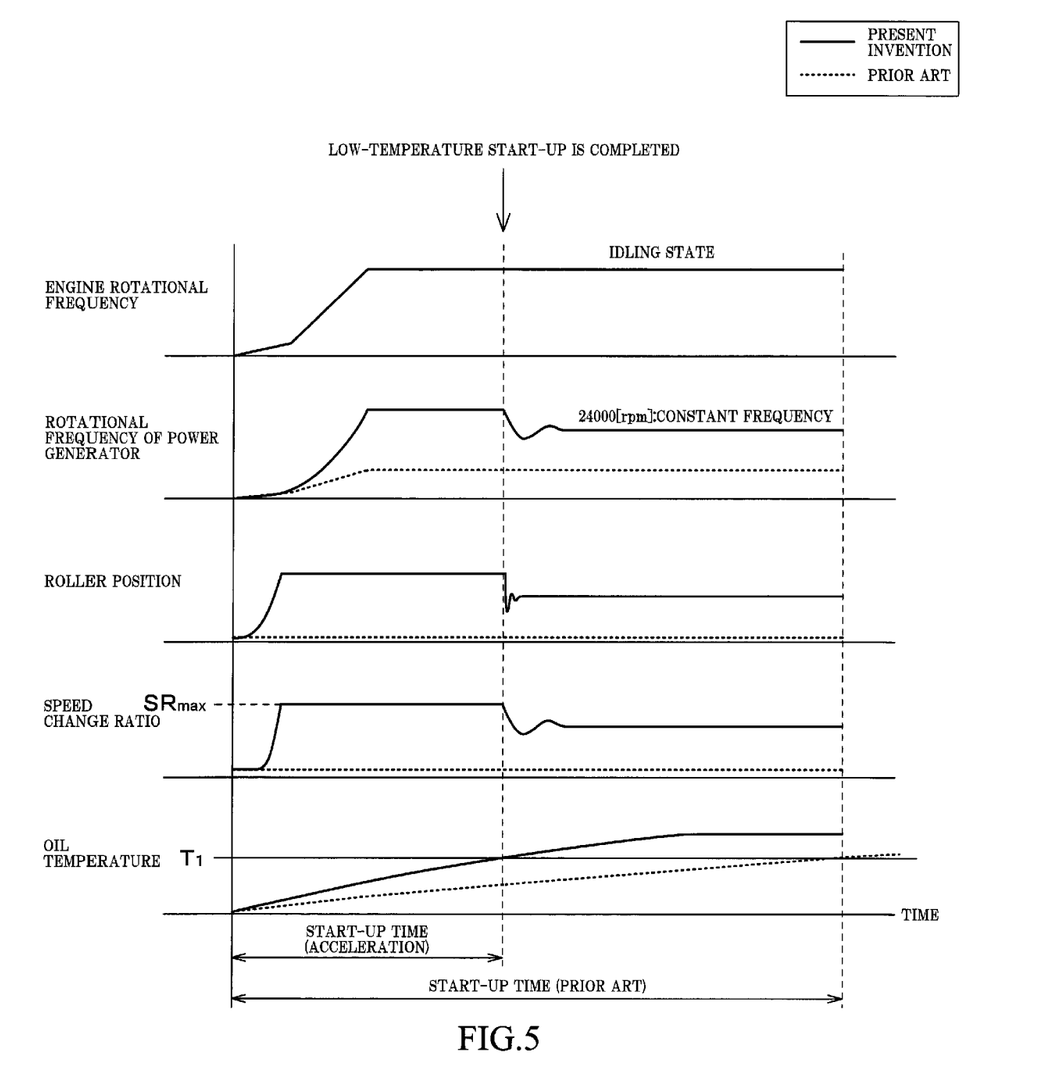
FIG. 5 is a timing chart for explaining changes in speed change ratio, oil temperature, and the like by the control of the power generation controller shown in FIG. 3.

FIG. 4 is a flowchart for explaining control contents of the power generation controller 40 shown in FIG. 3. FIG. 5 is a timing chart for explaining changes in the speed change ratio, the oil temperature, and the like by the control of the power generation controller 40 shown in FIG. 3. Hereinafter, the control contents in the flow of FIG. 4 will be described suitably with reference to FIGS. 3 and 5. First, when the aircraft engine is started up, the temperature condition determining section 42 performs below-described oil temperature calculation (see FIG. 6) in which information of the oil temperature detected by the oil temperature sensor 35 is subjected to predetermined processing (Step S1). Next, the temperature condition determining section 42 performs noise removal by subjecting the information of the oil temperature, output by the oil temperature calculation, to primary filtering processing (Step S2).

Next, the temperature condition determining section 42 determines whether or not the oil temperature having been subjected to the primary filtering processing satisfies the predetermined low-temperature condition (Step S3). For example, the low-temperature condition is a condition in which the oil temperature is less than a reference temperature $T_1$ (for example, 10° C.). When the temperature condition determining section 42 determines that the oil temperature does not satisfy the low-temperature condition (No in Step S3), the switching section 45 is switched to the power generation control section 44 side, and power generation control is performed (Step S10). In contrast, when the temperature condition determining section 42 determines that the oil temperature satisfies the low-temperature condition (Yes in Step S3), the switching section 45 is switched to the low-temperature start-up control section 43, and low-temperature start-up control is performed (Step S4).

The low-temperature start-up control section 43 sets the power generator 3 to the power non-generating state (for example, a free run state in which a power generation circuit is set to an open state) and continuously outputs the acceleration-side drive signal to the hydraulic actuator 20 such that the power roller 16 is positioned at the maximum acceleration position. With this, as shown in FIG. 5, in a state where the power generator 3 is idling, the speed change ratio of the CVT 10 becomes a maximum acceleration value $SR_{max}$. Thus, the oil in the casing 2 is stirred at high speed, and the oil temperature relatively quickly increases.

When it is determined during the low-temperature start-up control (Step S4) that the engine rotational frequency detected by the rotational frequency sensor 41 has exceeded a predetermined rotational frequency, the low-temperature start-up control section 43 preferably outputs a protection signal which weakens the rotational power transmitted through the CVT 10 to the power generator 3. Specifically, when it is determined during the low-temperature start-up control (during acceleration) that the engine rotational frequency has exceeded the predetermined rotational frequency, the low-temperature start-up control section 43 controls the hydraulic actuator 20 such that the power roller 16 of the CVT 10 is located at the deceleration side of the median in the speed change range.

For example, the lower limit stopper (not shown) configured to define the maximum deceleration position of the power roller 16 is provided at the trunnion 17. Therefore, when it is determined that the engine rotational frequency has exceeded the predetermined rotational frequency, the low-temperature start-up control section 43 preferably and continuously outputs a deceleration-side drive signal to the hydraulic actuator 20 such that the power roller 16 is positioned at the maximum acceleration position defined by the lower limit stopper. With this, for example, even when a pilot of the aircraft makes the engine idle, and this significantly increases the engine rotational frequency, accelerated high-rotation power can be prevented from being transmitted to the power generator 3.

When it is determined during the low-temperature start-up control that the engine rotational frequency has exceeded the predetermined rotational frequency, the low-temperature start-up control section 43 may output a protection signal which activates a breaker arranged on the power transmission path extending from the engine to the power generator 3.

During the low-temperature start-up control (Step S4), the temperature condition determining section 42 continuously determines whether or not the low-temperature start-up completion condition is satisfied. In the present embodiment, the low-temperature start-up completion condition is a condition (temperature continuation condition) in which a state where the oil temperature is the reference temperature $T_1$ or more is continued for a predetermined period of time or more. With this, even when the temperature of the operating oil used by the hydraulic actuator 20 varies depending on locations, the low-temperature start-up completion condition can be determined based on the information of the oil temperature obtained by averaging such non-uniform oil temperatures to some extent. Therefore, it is possible to prevent, for example, a case where the switching to the power generation control is performed when the oil temperature is low and a case where the quick switching to the power generation control is not performed even though the oil temperature is high.

Specifically, the temperature condition determining section 42 determines whether or not the oil temperature obtained by the oil temperature calculation (Step S1) is the reference temperature $T_1$ or more (Step S5). When the oil temperature is the reference temperature $T_1$ or more (Yes in Step S5), one is added to a first counter (delay counter) (Step S6). In contrast, when the oil temperature is not the reference temperature $T_1$ or more (No in Step S5), the first counter is reset (set to zero) (Step S7). Next, the temperature condition determining section 42 determines whether or not the first counter shows a predetermined value or more (for example, 500 or more) (Step S8). When the first counter does not show the predetermined value or more (No in Step S8), the process returns to Step S5. When the first counter shows the predetermined value or more (Yes in Step S8), it is determined that the low-temperature start-up completion condition is satisfied (Step S9).

When the low-temperature start-up completion condition is satisfied, the switching section 45 is switched from the low-temperature start-up control section 43 side to the power generation control section 44 side, and the power generation control is performed (Step S10). As shown in FIG. 5, in the power generation control, the power generation control section 44 sets the power generator 3 to the power generating state (a state where the power generation circuit is set to a closed state) and controls the hydraulic actuator 20 such that the rotational frequency of the power generator 3 becomes constant even when the engine rotational frequency detected by the rotational frequency sensor 41 changes.

According to the above configuration, when starting up the aircraft engine under low-temperature environment, performed is the low-temperature start-up control in which: the power generator 3 is set to the power non-generating state; and the power roller 16 of the CVT 10 is positioned at the acceleration side. Therefore, the rotational frequency of the CVT 10 increases, and heat generated by stirring loss and/or the like is increased. With this, a warm-up time until the start of the power generation is shortened.

Figure 6:
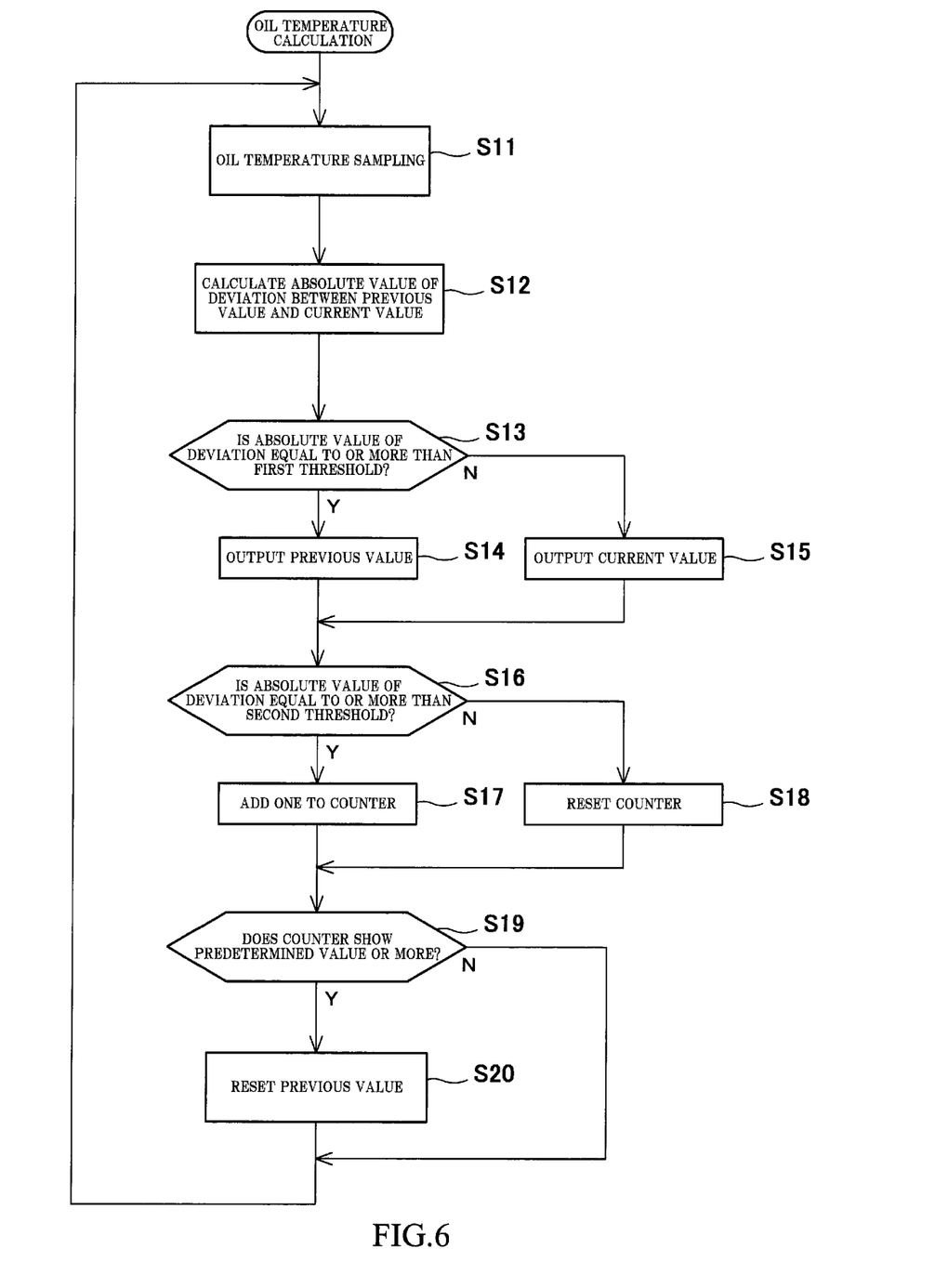
FIG. 6 is a flowchart for explaining processing of oil temperature calculation shown in FIG. 4.
Figure 7:
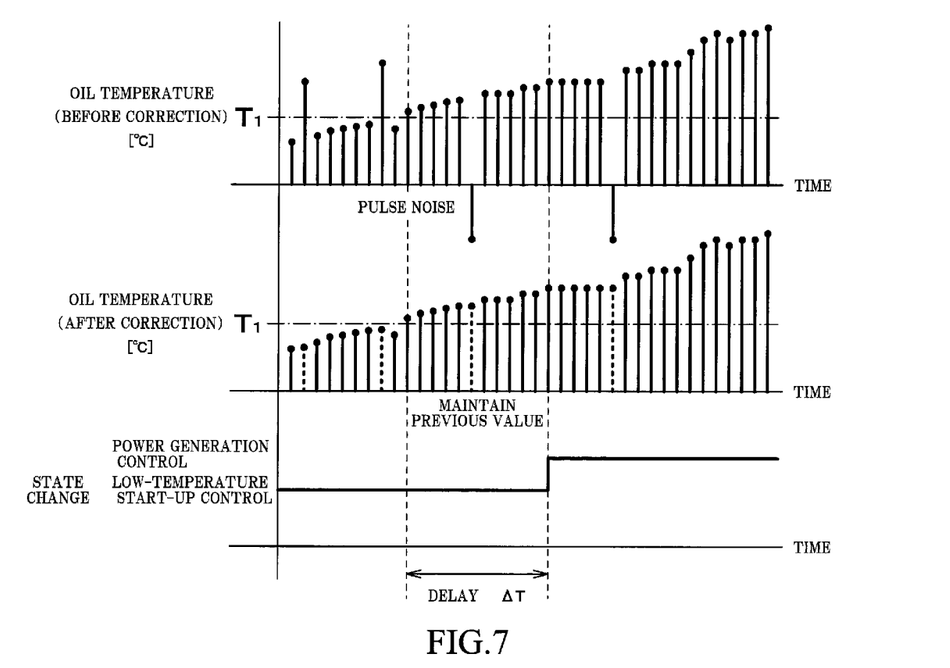
FIG. 7 is diagram for explaining signal processing in the oil temperature calculation shown in FIG. 6.

FIG. 6 is a flowchart for explaining processing of the oil temperature calculation shown in FIG. 4. FIG. 7 is a diagram for explaining signal processing in the oil temperature calculation shown in FIG. 6. Hereinafter, calculation contents in the flow of FIG. 6 will be described suitably with reference to FIGS. 3 and 7. First, the temperature condition determining section 42 obtains a temperature sample value by converting from analog to digital the information of the temperature detected by the oil temperature sensor 35 and sampling the information at a predetermined cycle (Step S11). Next, the temperature condition determining section 42 calculates an absolute value of a deviation between a previous value of the temperature sample value and a current value of the temperature sample value (Step S12).

Next, the temperature condition determining section 42 determines whether or not the absolute value of the deviation between the previous value of the temperature sample value and the current value of the temperature sample value is a first threshold $TH_1$ (for example, 1.0° C.) or more (Step S13). When it is determined that the absolute value of the deviation is not the first threshold $TH_1$ or more (No in Step S13), the temperature condition determining section 42 outputs the current value (Step S15). In contrast, when it is determined that the absolute value of the deviation is the first threshold $TH_1$ or more (Yes in Step S13), the temperature condition determining section 42 outputs the previous value instead of the current value (Step S14). To be specific, the previous value is substituted for the current value (see broken lines in FIG. 7). With this, when the information of the oil temperature which is significantly different in value from the actual oil temperature is momentarily received due to pulse noise or the like, such inaccurate value is prevented from being used in the condition determination of the oil temperature.

Next, when the number of times the absolute value of the deviation between the previous value of the temperature sample value and the current value of the temperature sample value becomes a second threshold (for example, 3° C.) or more becomes a predetermined number of times or more in a row, the temperature condition determining section 42 resets the previous value. Specifically, the temperature condition determining section 42 determines whether or not the absolute value of the deviation is a second threshold $TH_2$ or more (Step S16). When it is determined that the absolute value of the deviation is the second threshold $TH_2$ or more (Yes in Step S16), one is added to a second counter (Step S17). When the absolute value of the deviation is not the threshold $TH_2$ or more (No in Step S16), the second counter is reset (set to zero) (Step S18).

Then, the temperature condition determining section 42 determines whether or not the second counter shows a predetermined value $C_0$ (for example, 10) or more (Step S19). When the second counter shows the predetermined value $C_0$ or more (Yes in Step S19), the temperature condition determining section 42 resets the previous value (for example, the previous value is substituted for the current value) (Step S20), and the process returns to Step S11. When the second counter does not show the predetermined value $C_0$ or more (No in Step S19), the process returns to Step S11. When a first value of the temperature sample value is significantly different from the actual oil temperature due to noise or the like, the previous value can be reset and corrected to the accurate oil temperature by Steps S16 to S20.

It should be noted that the present invention is not limited to the above embodiment. Modifications, additions, and eliminations may be made with respect to the configuration of the embodiment. For example, in the above embodiment, the toroidal continuously variable transmission 10 is described as a transmission configured to change the speed of the rotational power of the aircraft engine and transmits the rotational power to the power generator. However, the toroidal continuously variable transmission 10 may be a different type of transmission as long as the speed change is performed by the hydraulic pressure. Moreover, the power generator 3 generates electric power at a constant rotational frequency. However, the power generator 3 may generate electric power at a variable rotational frequency. Furthermore, in the low-temperature start-up control, the speed change element (power roller 16) of the transmission is positioned at the maximum deceleration position. However, the speed change element (power roller 16) of the transmission may be positioned between a constant-speed position and the maximum deceleration position. In the above embodiment, the counter is not used in the determination of the low-temperature condition but is used in the determination of the low-temperature start-up completion condition. To be specific, the content of the dissatisfying of the low-temperature condition and the content of the satisfying of the low-temperature start-up completion condition are made different from each other but may be the same as each other.

REFERENCE SIGNS LIST 3 power generator
10 toroidal CVT (hydraulic transmission)
16 power roller (speed change element)
19 upper limit stopper
20 hydraulic actuator
40 power generation controller
42 temperature condition determining section
43 low-temperature start-up control section
44 power generation control section

The invention claimed is:

1. A power generation controller of an aircraft, the power generation controller being configured to control a hydraulic transmission configured to change speed of rotational power of an aircraft engine and transmit the rotational power to a power generator, the power generation controller comprising:
a low-temperature start-up control section configured to, when determined that an oil temperature of a hydraulic actuator configured to change an operation position of a speed change element of the hydraulic transmission satisfies a predetermined low-temperature condition when starting up the aircraft engine, set the power generator to a power non-generating state and control the hydraulic actuator such that the speed change element is positioned at an acceleration side of a median in a speed change range; and
a power generation control section configured to, when determined that the oil temperature satisfies a predetermined low-temperature start-up completion condition, set the power generator to a power generating state and control the hydraulic actuator in accordance with a rotational frequency of the aircraft engine.

2. The power generation controller according to claim 1, wherein:
the hydraulic transmission is a continuously variable transmission including an upper limit stopper configured to defines a maximum acceleration position of the speed change element; and
when the oil temperature satisfies the low-temperature condition, the low-temperature start-up control section continuously outputs an acceleration-side drive signal to the hydraulic actuator such that the speed change element is positioned at the maximum acceleration position defined by the upper limit stopper.

3. The power generation controller according to claim 1, wherein the low-temperature start-up completion condition includes a temperature continuation condition in which a state where the oil temperature is a reference temperature or more is continued for a predetermined period of time or more.

4. The power generation controller according to claim 3, further comprising a temperature condition determining section configured to determine whether or not the oil temperature satisfies the low-temperature start-up completion condition, wherein:
the temperature condition determining section samples information of the oil temperature at a predetermined cycle; and
the low-temperature start-up completion condition is a condition in which a number of times a sample value of the oil temperature becomes a reference temperature or more becomes a predetermined number of times or more in a row.

5. The power generation controller according to claim 4, wherein when an absolute value of a deviation between a previous value of the sample value and a current value of the sample value is a first threshold or more, the temperature condition determining section substitutes the previous value for the current value.

6. The power generation controller according to claim 5, wherein when a number of times the absolute value of the deviation becomes a second threshold or more becomes a predetermined number of times or more in a row, the temperature condition determining section resets the previous value.

7. The power generation controller according to claim 1, wherein when determined that the rotational frequency of the aircraft engine has exceeded a predetermined rotational frequency, the low-temperature start-up control section outputs a protection signal which weakens the rotational power transmitted to the power generator through the hydraulic transmission.

8. The power generation controller according to claim 7, wherein the protection signal is a signal which controls the hydraulic actuator such that the speed change element is positioned at a deceleration side of the median in the speed change range.

\* \* \* \* \*